(No Model.)
S. FREEMAN.
GRAIN SEPARATOR.
No. 402,012. Patented Apr. 23, 1889.
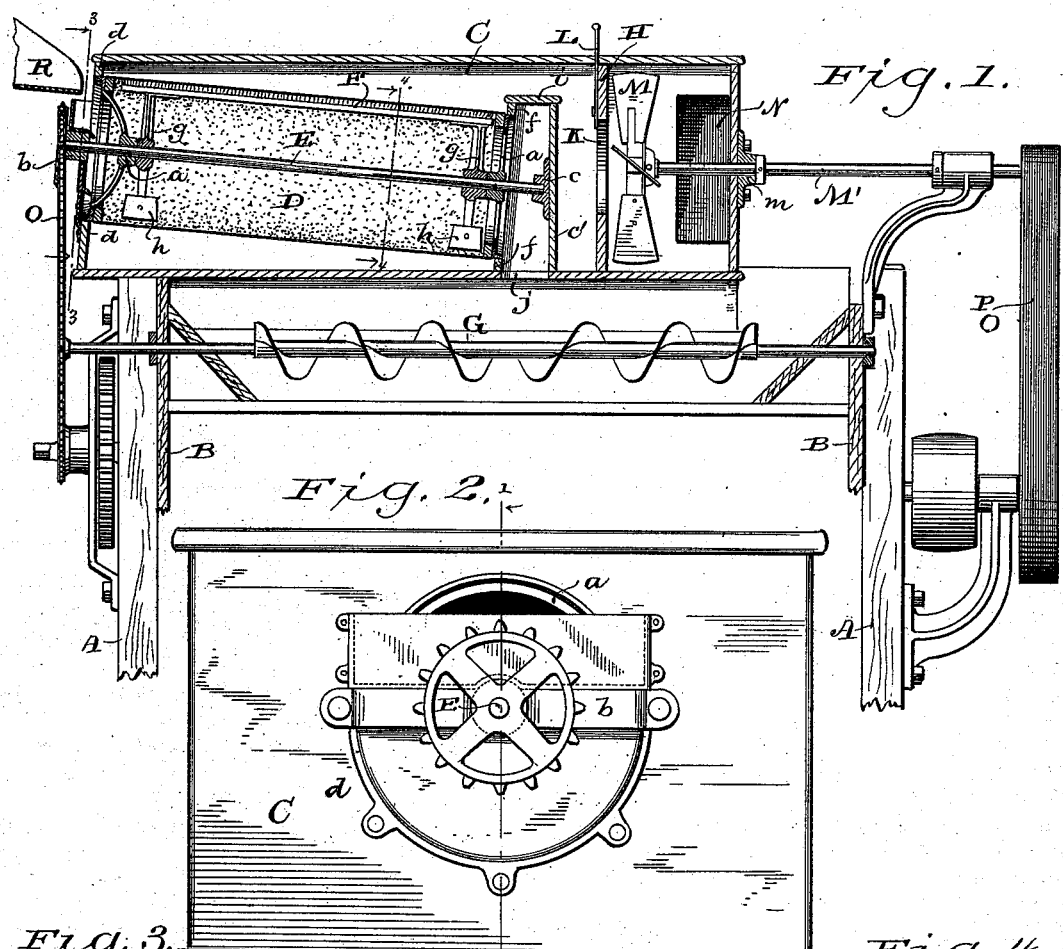
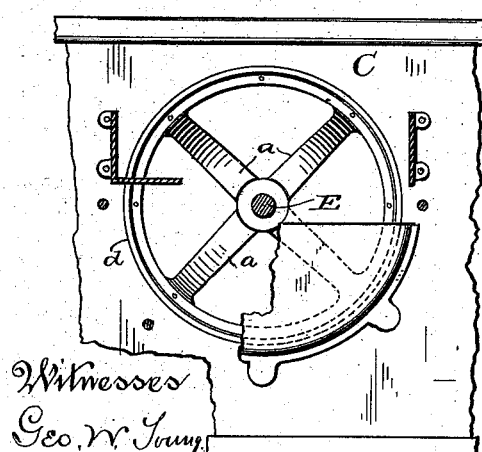
Witnesses
Geo. W. Young
William Klug
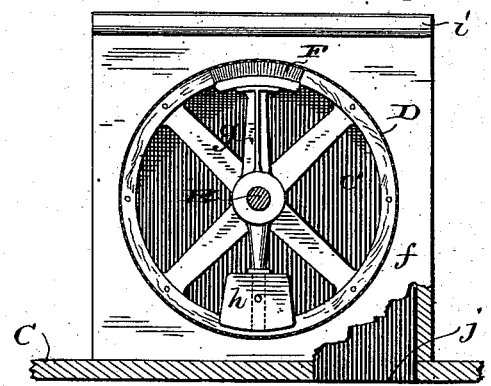
Inventor
Stephen Freeman
By Steel & Underwood
Attorneys.

UNITED STATES PATENT OFFICE.

STEPHEN FREEMAN, OF RACINE, WISCONSIN.

GRAIN-SEPARATOR.

SPECIFICATION forming part of Letters Patent No. 402,012, dated April 23, 1889.

Application filed June 21, 1888. Serial No. 277,753. (No model.)

*To all whom it may concern:*

Be it known that I, STEPHEN FREEMAN, of Racine, in the county of Racine, and in the State of Wisconsin, have invented certain new and useful Improvements in Grain-Separators; and I do hereby declare that the following is a full, clear, and exact description thereof.

My invention relates to dust-separators for fanning-mills, and will be fully described hereinafter.

In the drawings, Figure 1 is a section of my device on line 1 1, Fig. 2, and showing also in section the upper portion of a fanning-mill. Fig. 2 is a front end view of my device. Fig. 3 is a section on line 3 3, Fig. 1; and Fig. 4 is a section on line 4 4, Fig. 1.

A A are two of the uprights of a mill, and B B the sides.

C is a box, which rests upon and is secured to the top of the mill.

D is a gauze cylinder, which is secured to its shaft E by spiders $a$ $a$. This shaft turns at one end in a bearing, $b$, that is secured to the front of the box, and at its inner end in a bearing, $c$, on a partition, $c'$, and therefore the cylinder is inclined from front to rear. The upper end of the cylinder fits snugly in the front wall, $d$, of the box C, and the lower end in a like opening in a partition, $f$, and between the bearings of shaft E the arms $g$ $g$ of a brush, F, are hung loosely on the shaft, and each of these arms carries on its end opposite the brush a weight, $h$, which weights serve to support the brush above the shaft E and in contact with the inner periphery of the cylinder. A cap, $i$, covers the space between the partitions $f$ and $c'$ above, and a slot, $j$, in the bottom of box C leads from the gauze cylinder to the box of a conveyer, G, through the space between the partitions $f$ and $c'$. Another partition, H, is arranged in box C back of partition $c'$, which partition extends from the top to the bottom of box C, but has a central draft-opening, K, the size of which may be regulated by a gate, L, and between this last-named partition and the rear end by the box is located a suction-fan, M, the shaft $M'$ of which turns in a bearing, $m$, in the rear end of the box, which, with the partition, forms the fan-casing, which is provided with an outlet, N, that leads into the dust-spout.

The shaft E is driven by a belt, O, and the shaft $M'$ by a belt, P, both of which are connected to any suitable driving-power.

In operation the seed or grain is let into the highest end of cylinder D from a spout, R, and the fan is started as well as the cylinder, and as the latter is revolved it carries the seed up on its sides until the brush takes it off, and while the grain is being thus agitated it is subjected to the draft produced by the fan, and the dust is drawn through the meshes of the gauze, leaving the seed to fall between the walls $f$ and $c'$ to the conveyer, which properly distributes it in the mill.

The gauze composing cylinder D may be made fine enough to retain the smallest grass-seed.

Having thus fully described my invention, what I claim as new, and desire to secure by Letters Patent, is—

1. In a grain-separator for fanning-mills, the combination, with a housing, of a gauze cylinder located therein, a fan and fan-chamber, a conduit between the fan-chamber and the cylinder-housing, and a chamber leading from the interior of the cylinder, the walls of which last-named chamber form a partition between the housing and the interior of the cylinder, so that the draft from the fan will be drawn through the walls of the cylinder, substantially as described.

2. The combination, in a grain-separator, of an inclined gauze cylinder and housing therefor, a fan and fan-chamber, the latter communicating with the cylinder-housing, and a chamber inclosing the inner end of the cylinder and leading therefrom, substantially as described.

In testimony that I claim the foregoing I have hereunto set my hand, at Milwaukee, in the county of Milwaukee and State of Wisconsin, in the presence of two witnesses.

STEPHEN FREEMAN.

Witnesses:
S. S. STOUT,
WM. KLUG.